US010267290B2

(12) United States Patent
Vaz

(10) Patent No.: US 10,267,290 B2
(45) Date of Patent: Apr. 23, 2019

(54) GUIDE VANE ASSEMBLY

(71) Applicant: Guy Andrew Vaz, Singapore (SG)

(72) Inventor: Guy Andrew Vaz, Singapore (SG)

(*) Notice: Subject to any disclaimer, the term of this patent is extended or adjusted under 35 U.S.C. 154(b) by 0 days.

(21) Appl. No.: 15/735,746

(22) PCT Filed: Jun. 24, 2015

(86) PCT No.: PCT/SG2015/050178
§ 371 (c)(1),
(2) Date: Dec. 12, 2017

(87) PCT Pub. No.: WO2016/209161
PCT Pub. Date: Dec. 29, 2016

(65) Prior Publication Data
US 2018/0163696 A1    Jun. 14, 2018

(51) Int. Cl.
*F03D 3/04* (2006.01)
*F03D 3/00* (2006.01)
*F03D 3/06* (2006.01)

(52) U.S. Cl.
CPC ........... *F03D 3/0418* (2013.01); *F03D 3/005* (2013.01); *F03D 3/04* (2013.01); *F03D 3/0409* (2013.01); *F03D 3/061* (2013.01); *F03D 3/062* (2013.01); *F03D 3/065* (2013.01); *Y02E 10/74* (2013.01)

(58) Field of Classification Search
CPC .......... F03D 3/0418; F03D 3/005; F03D 3/04; F03D 3/0427; F03D 3/065
See application file for complete search history.

(56) References Cited

U.S. PATENT DOCUMENTS

| 1,382,591 | A | * | 6/1921 | Ackermann | .......... F03D 3/0418 415/4.2 |
| 2,005,470 | A | * | 6/1935 | Olson | .......... F03D 3/0418 415/45 |
| 4,551,631 | A | * | 11/1985 | Trigilio | .......... F03D 3/0409 290/55 |
| 6,808,366 | B2 | * | 10/2004 | Sikes | .......... F03D 3/02 416/1 |
| 7,241,105 | B1 | * | 7/2007 | Vanderhye | .......... B63H 13/00 415/4.2 |

(Continued)

FOREIGN PATENT DOCUMENTS

| JP | 2014-25473 | 2/2014 |
| WO | WO 2015/004588 A1 | 1/2015 |

OTHER PUBLICATIONS

International Search Report, Application No. PCT/SG2015/050178, dated Oct. 13, 2015, 1 page.

*Primary Examiner* — Sean Gugger
(74) *Attorney, Agent, or Firm* — Patterson Thuente Pederson, P.A.

(57) ABSTRACT

Disclosed herein is a guide vane assembly including a rig structure configurable with a turbine and having an inner portion and an outer portion forming extremities thereof, a sail and an actuator assembly. The sail is coupled to the rig structure and shaped for presenting a trough to a flow of impinging fluid, the trough having a depth defined from the rig plane. The sail extends from the outer portion towards the inner portion of the rig structure to terminate at an inner edge whereat a vent is defined. The fluid impinging on the sail is concentrated at the trough and redirected towards the turbine from the vent.

21 Claims, 11 Drawing Sheets

(56) References Cited

U.S. PATENT DOCUMENTS

| | | | | |
|---|---|---|---|---|
| 7,288,850 | B2* | 10/2007 | Hicks | F03D 3/0409 290/44 |
| 7,762,777 | B2* | 7/2010 | Vanderhye | F03D 3/062 415/4.4 |
| 8,511,965 | B2 | 8/2013 | Vaz | |
| 8,882,439 | B2 | 11/2014 | Vaz | |
| 9,534,581 | B2 | 1/2017 | Vaz | |
| 2009/0184521 | A1* | 7/2009 | Chong | F03D 3/049 290/55 |
| 2010/0045039 | A1* | 2/2010 | Stroup | F03D 3/0418 290/44 |
| 2010/0254799 | A1* | 10/2010 | Caines | F03D 3/0418 415/36 |
| 2011/0291421 | A1* | 12/2011 | Tsung | F03D 3/0409 290/55 |
| 2012/0124985 | A1* | 5/2012 | Lei | F03D 3/005 60/398 |
| 2012/0175883 | A1* | 7/2012 | Nica | F03D 3/061 290/55 |
| 2013/0119661 | A1* | 5/2013 | Pringle | F03D 3/002 290/44 |
| 2013/0156581 | A1* | 6/2013 | Chung | F03D 3/0418 416/155 |
| 2016/0169196 | A1* | 6/2016 | Valenti | F03D 3/02 416/197 A |
| 2016/0298605 | A1* | 10/2016 | Brendle | F03D 7/06 |
| 2017/0045034 | A1* | 2/2017 | Lai | F03D 3/02 |
| 2018/0003152 | A1* | 1/2018 | Piskorz | F03D 3/0418 |

* cited by examiner

US 10,267,290 B2

GUIDE VANE ASSEMBLY

PRIORITY CLAIM

The present application is a National Phase entry of PCT Application No. PCT/SG2015/050178, filed Jun. 24, 2015, which is hereby fully incorporated herein by reference.

TECHNICAL FIELD

This disclosure relates generally to a guide vane assembly for use with turbines including vertical wind turbines.

BACKGROUND

Wind energy has been used for powering machinery since ancient times. Since then, the need to generate power from greener and renewable sources like the wind has become ever more urgent, and wind turbines have been developed for the production 10 of electrical power. In spite of this, wind power has seldom succeeded in commercial terms, owing to the variability of the supply of wind over time and geography. Typically, wind turbines operating in areas with consistently high wind speeds tend to be the most commercially viable, but such sites are rare.

Different wind turbine designs have been developed for use in different scenarios and applications. For example, they may be classified according to whether the blades of the wind vane rotate about an axis of a shaft which is horizontally or vertically disposed. Horizontal axis wind turbines (HAWTs) tend to be more commonly deployed as they tend to be more efficient: this is a result of blade rotation in a direction perpendicular to the direction of wind flow so that they receive energy through the entire cycle during rotation. However, they suffer various disadvantages, not least in the sheer height, size and weight of the towers and the blades, which makes installation, operation and maintenance extremely costly. They also need careful positioning into the wind, and are unlikely to work well in conditions where the wind is variable in speed and direction. Such wind turbines are also potentially disruptive, in the visual sense as well as to anything from wildlife, to the transmissions of radio signals.

Vertical axis wind turbines (VAWTs) are inherently less efficient as the blades receive energy from the wind for only a part of its rotation cycle during which it is "blown" forward. For much of the remaining part of the cycle, the blade rotates in a direction substantially against the direction of wind flow. There has been disclosure of use of guide vanes to better guide the wind flow to the blades to improve efficiency of the VAWTs. However, use of guide vanes with a planar surface often results on an amount of the wind impinging on the planar surface of the guide vanes being dispersed away from the intended direction of flow towards the blades. Therefore, there exists a need for a guide vane for addressing the foregoing problems.

SUMMARY

In accordance with an aspect of the disclosure, there is disclosed a guide vane assembly comprising a rig structure configurable with a turbine and having an inner portion and an outer portion forming extremities thereof, a sail and an actuator assembly. The rig structure defines a rig plane with the inner portion thereof being positioned nearer to the turbine than the outer portion. The sail is coupled to the rig structure and shaped for presenting a trough to a flow of impinging fluid, the trough having a depth defined from the rig plane. The sail extends from the outer portion towards the inner portion of the rig structure to terminate at an inner edge whereat a vent is defined. The fluid impinging on the sail is concentrated at the trough and redirected towards the turbine from the vent. The actuator assembly is coupled to the rig structure and whereto the portion of the sail at the vent is anchored. The actuator assembly is operable for reciprocating the inner edge of the sail towards and away from the rig plane for varying the depth of the trough at the vent.

In accordance with a second aspect of the disclosure, there is disclosed a guide vane structure comprising a support structure and a plurality of guide vane assemblies. The support structure defines a cylindrical hollow with a structure axis extending along the longitude thereof. The cylindrical hollow is for receiving a turbine comprising a plurality of rotor blades therewithin with the axis of rotation of the plurality of rotor blades substantially coinciding with the structure axis. The plurality of guide vane assemblies are coupled to and along an outer portion of the support structure and are spatially distributed about the structure axis. Each of the plurality of guide vanes comprises a rig structure, a sail and an actuator assembly. The rig structure has an inner portion and an outer portion forming extremities thereof with the rig structure defining a rig plane with the inner portion being positioned nearer to the turbine than the outer portion. The sail is coupled to the rig structure and shaped for presenting a trough to a flow of impinging fluid. The trough has a depth defined from the rig plane with the sail extending from the outer portion towards the inner portion of the rig structure to terminate at an inner edge whereat a vent is defined. The fluid impinging on the sail is concentrated at the trough and redirected towards the turbine from the vent. The actuator assembly is coupled to the rig structure and whereto the portion of the sail at the vent is anchored. The actuator assembly is operable for positioning the inner edge of the sail one of towards and away from the rig plane for varying the depth of the trough at the vent.

DETAILED DESCRIPTION

Figure 1:
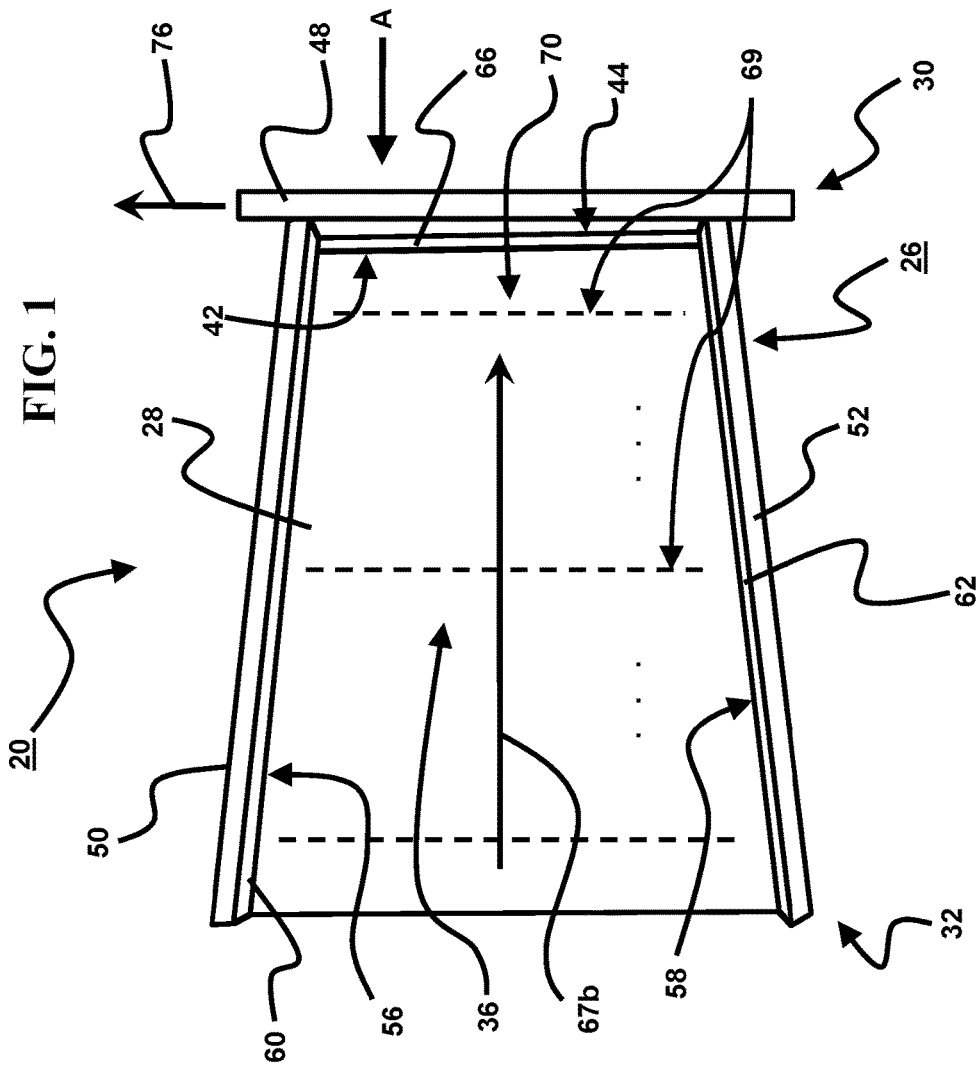
FIG. 1 shows an exemplary partial front view of a guide vane assembly in accordance with an aspect of the disclosure for use with an engine.
Figure 2:
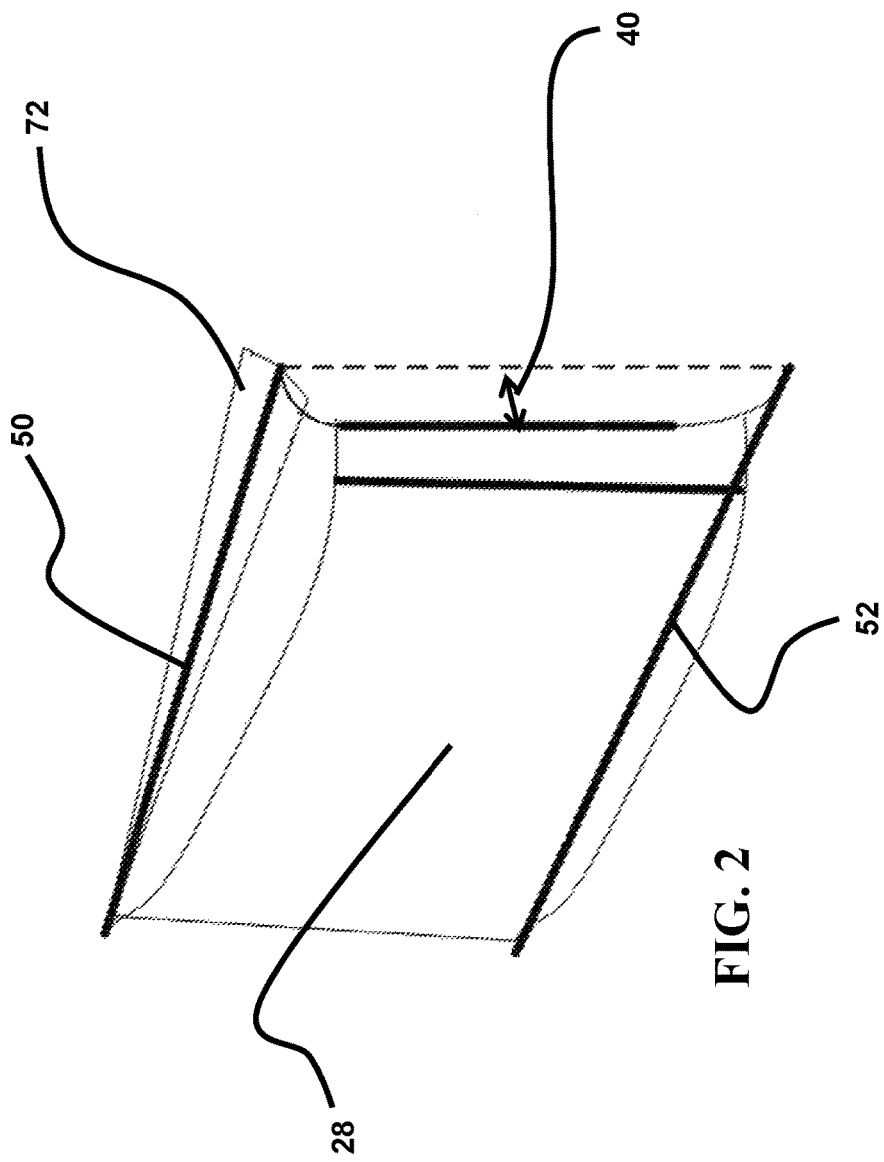
FIG. 2 shows a perspective view of the guide vane assembly of FIG. 1.
Figure 3:
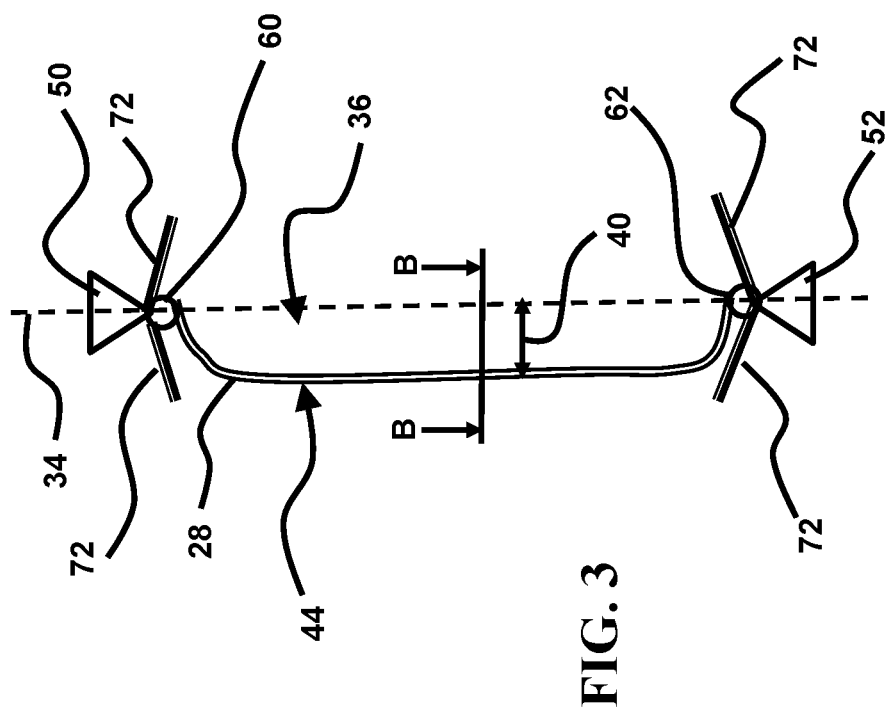
FIG. 3 shows a partial side sectional view of the guide vane assembly of FIG. 1 according to view A.
Figure 4:
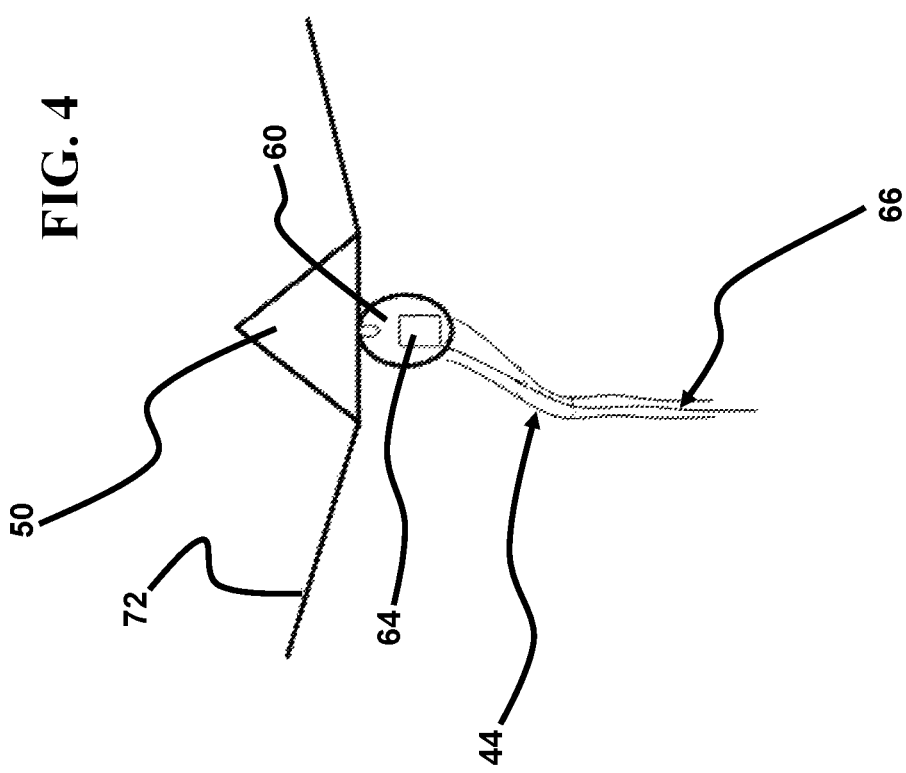
FIG. 4 shows a partial side sectional view of a sail coupled to a top boom of the guide vane assembly of FIG. 3.
Figure 5:
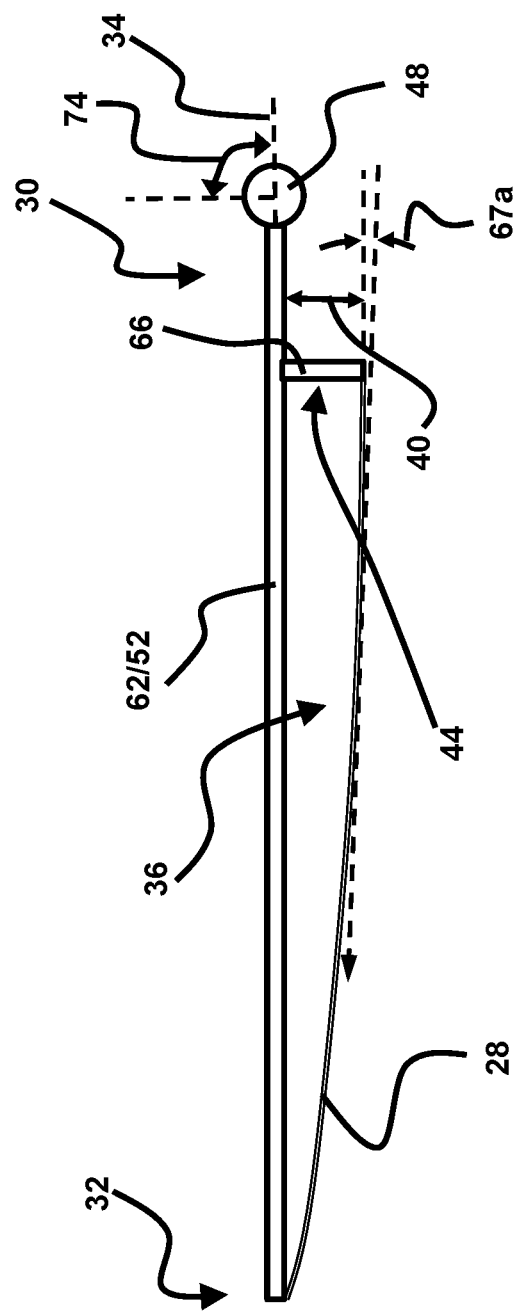
FIG. 5 shows a partial plan view of the guide vane assembly of FIG. 1 according to view B-B of FIG. 3.
Figure 6:
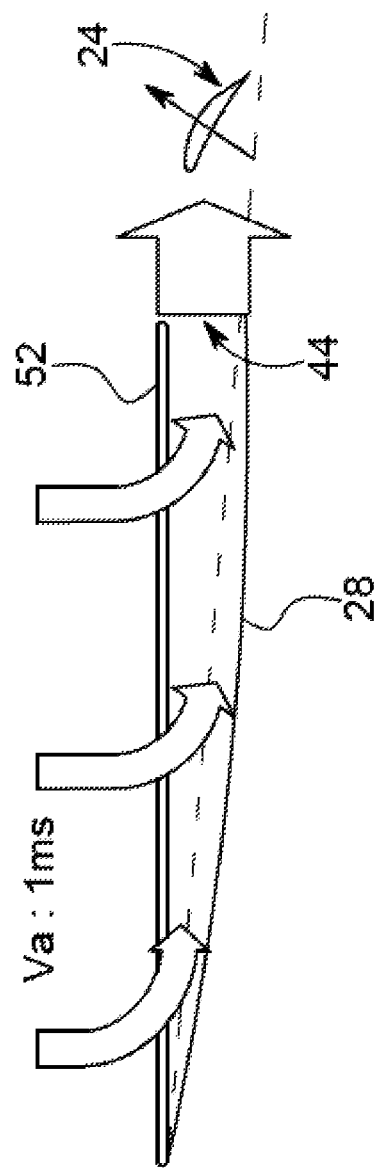
FIG. 6 shows a partial plan view of the guide vane assembly of FIG. 1 according to view B-B of FIG. 3 with wind flow being redirected towards a rotor blade of a turbine.
Figure 7:
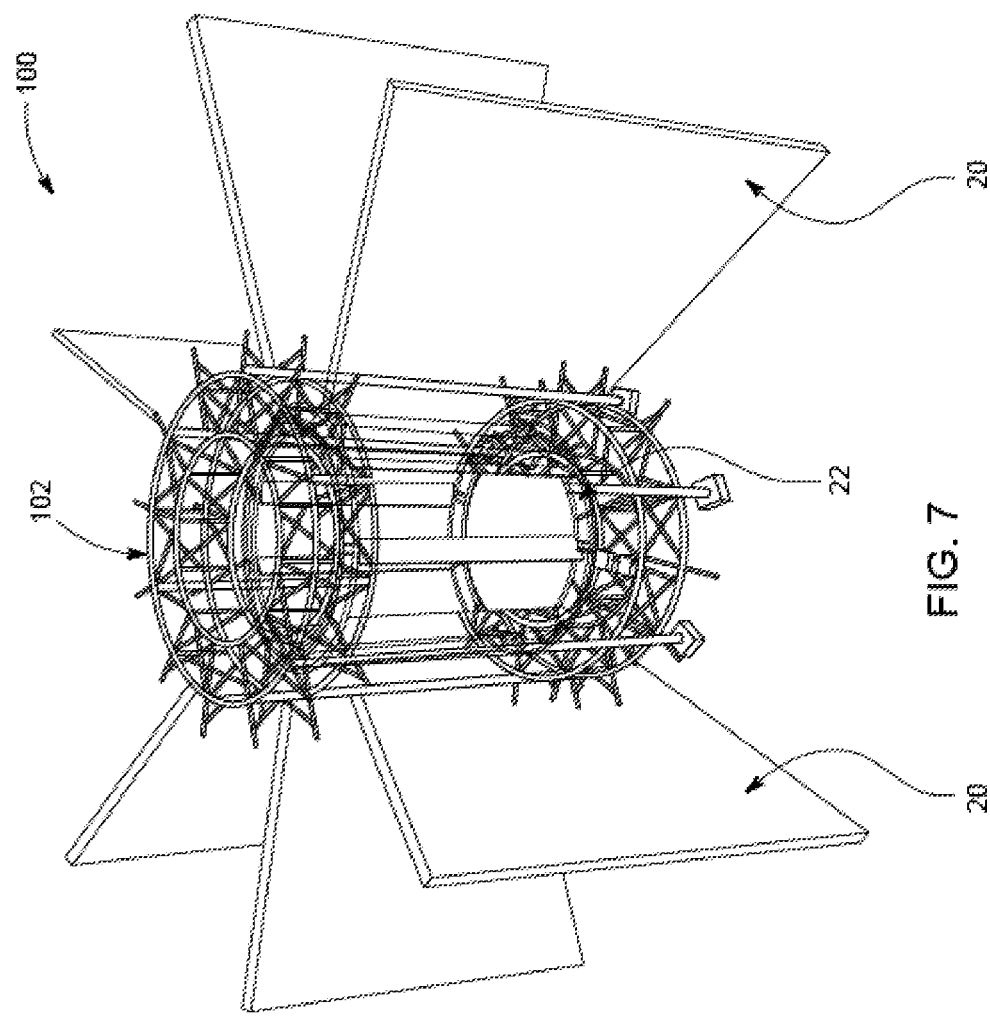
FIG. 7 shows a perspective view of a plurality of the guide vane assembly of FIG. 1 being configure for forming a guide vane structure for use with a turbine.
Figure 8:
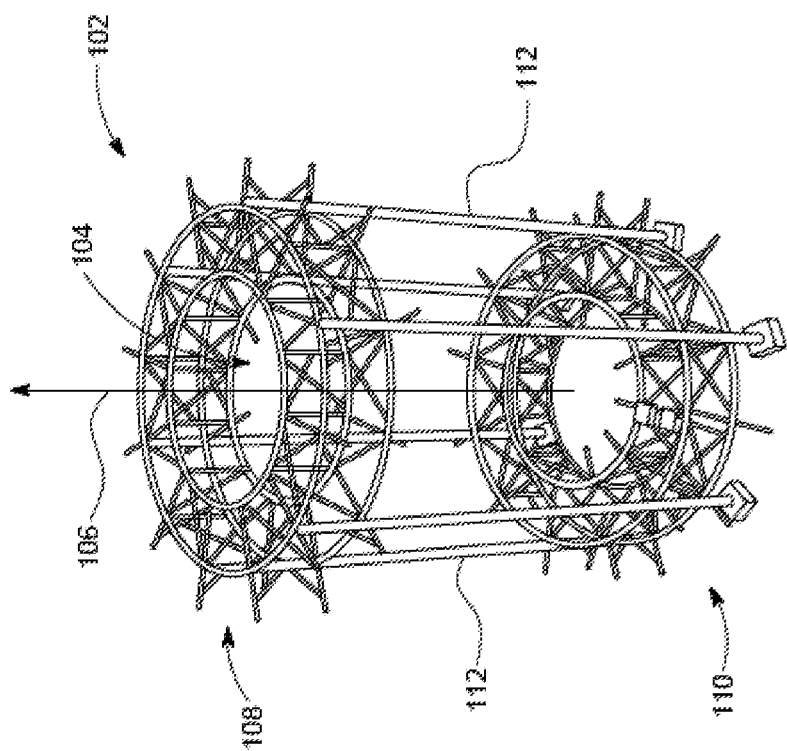
FIG. 8 shows a support structure for supporting the plurality of the guide vane assembly in the guide vane structure of FIG. 7.
Figure 9:
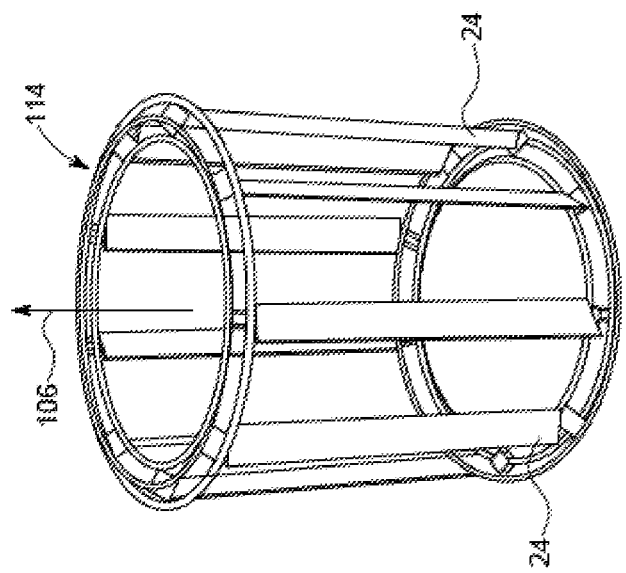
FIG. 9 shows an array of rotor blades being arranged in a cage for being configured with the guide vane structure of FIG. 7.
Figure 10:
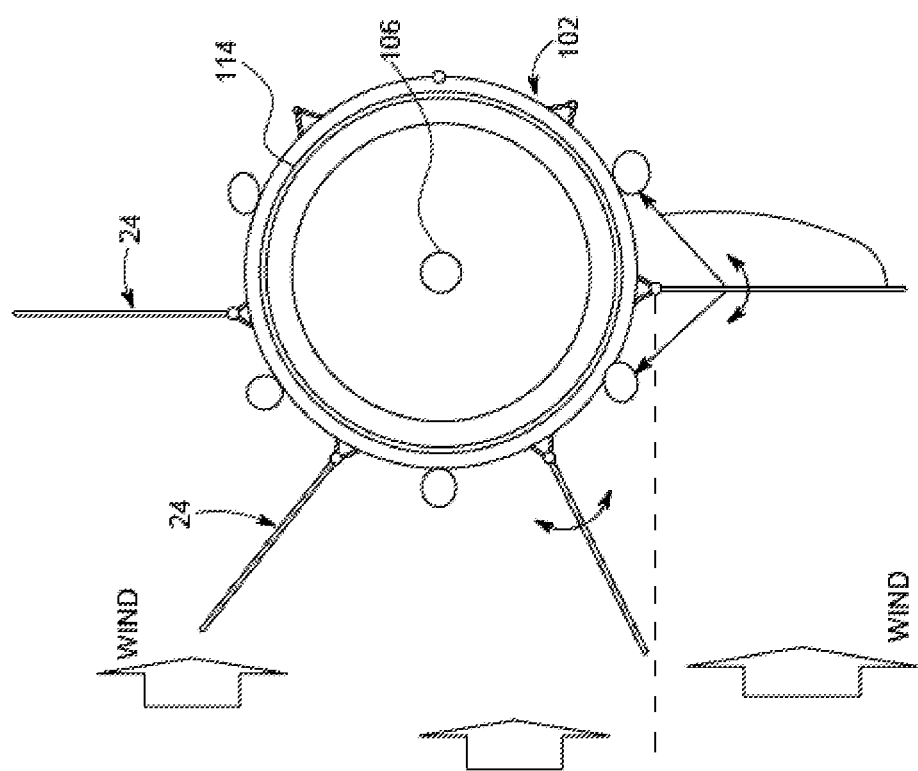
FIG. 10 shows a partial plan view representation of the guide vane structure of FIG. 7 when configured with a turbine.
Figure 11:
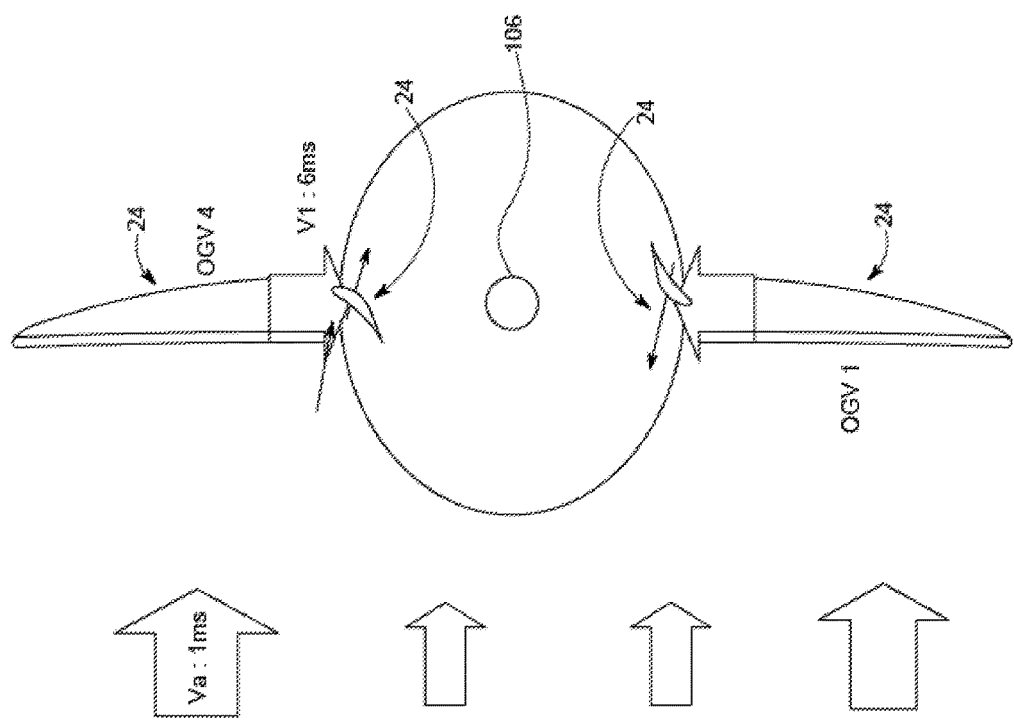
FIG. 11 shows a plan view of two of the plurality of the guide vane assembly when configured with the guide vane structure of FIG. 7 with illustration of wind being redirected to rotor blades of the turbine.

An exemplary embodiment of the present disclosure, a guide vane assembly 20, is described hereinafter with reference to FIG. 1 to FIG. 11. The guide vane assembly 20 can be used with a turbine 22 for converting energy from fluid flow into mechanical movement. The turbine 22 comprises plurality of rotor blades 24 for harvesting energy from fluid flow, for example wind flow. In order for the energy from the fluid flow to be efficiently harvested, the fluid needs to be presented in substantially the right direction of flow to each of the plurality of rotor blades 24.

In one embodiment, the guide vane assembly 20 comprises a rig structure 26 configurable with the turbine 22 and a sail 28. The rig structure 26 has an inner portion 30 and an outer portion 32 forming extremities thereof. The rig structure 26 defines a rig plane 34 with the inner portion 30 being positioned nearer to the turbine 22 than the outer portion 32 thereof. The sail 28 is coupled to the rig structure 26 and is shaped for presenting a trough 36 to a flow of impinging fluid. The impinging fluid can be one or a combination of wind, water or any type of liquids. The trough 36 has a depth 40 defined from the rig plane 34. The sail 28 extends from the outer portion 32 towards the inner portion 30 of the rig structure 26 to terminate at an inner edge 42 whereat a vent 44 is defined. The fluid impinging on the sail 28 is concentrated at the trough 36 and redirected towards the turbine 22 from the vent 44. The guide vane assembly 20 further comprises an actuator assembly coupled to the rig structure 26 and whereto the portion of the sail 22 at the vent 44 is anchored. The actuator assembly is operable for reciprocating the inner edge 42 of the sail 22 towards and away from the rig plane 34 for varying the depth 44 of the trough 36 at the vent.

The rig structure 26 comprises a post 48 configured at the inner portion 30 of the rig structure 26 and a pair of booms, specifically a first boom 50 and a second boom 52, extending from the post 48. The post 48 has an upright and a substantially vertical orientation and is preferably coupled, at least at one end thereof, to a support structure. The first boom 50 and the second boom 52 are spaced apart along the post 48 with each thereof extending substantially perpendicular the post 48 towards the outer portion of the rig structure 26. In one embodiment each of the first boom 50 and the second boom 52 are angled away from each other with each thereof being supported by support lines extending between the post 48 and each of the first boom 50 and the second boom 52.

Each of the post 48, the first boom 50 and the second boom 52 are formed from truss structures. However, use of other types of elongated structures with a solid core, a hollow core or a frame-based construction are not precluded from being use in forming or constructing the post 48, the first boom 50 and the second boom 52. For example, each of the first boom 50 and the second boom are formed from truss structures with a triangular cross-sectional shape, with a corner of the triangular cross-section of the truss structure of one of the first boom 50 and the second boom 52 inwardly pointed towards a corner of the triangular cross-section of the truss structure of the other of the first boom 50 and the second boom 52.

The sail 28 has an upper edge 56 and a lower edge 58 coupled respectively to the first boom 50 and the second boom 52. The sail 28 can be directly coupled to the first boom 50 and the second boom 52. Alternatively, the rig structure 26 further comprises a first mast 60 coupled to the first boom 50 whereto the upper edge 56 of the sail 28 slidably couples, and a second mast 62 whereto the lower edge 58 of the sail 28 slidably couples. This enables the sail 28 to be collapsible from an extended state towards the inner portion 30 of the rig structure 26 to a retracted state. In one embodiment, each of the first boom 50 and the second boom 52 is constructed to allow flexure. Hence, as an alternative to truss structures, the first boom 50 and the second boom are constructible from metal H/I beams, composite elongates or the like structures to enable the first mast 60 and the second mast 62 to swing.

Each of the upper mast 60 and the lower mast 62 can comprise and employ a pulley-line assembly to control deployment of the sail 28 between the extended state and the collapsed state. The pulley-line assemblies can be coupled to independent upper and lower cranks or to a common crank operable for communicating motion to the respective pulley line assembly. The crank can be hand-operated or counted to a motor for operation thereof.

The sail 28 is formed from a flexible material, for example, fabric, denim, polymeric, cellulosic, metallic mesh or any combination thereof. When the sail 28 is in the extended state, the depth of the trough 40 of the trough 36 increases the nearer it gets to the inner portion 30 of the rig structure 26.

The actuator assembly comprises a winch 64 and a control line 66 whereto the inner edge 42 of the sail 28 is coupled. The winch 64 is for one of taking and releasing slack in the control line 66 to thereby displace the inner edge 42 of the sail 28 one of towards and away from the rig plane 34. The control line 66 can be a braided cable, a tape, a composite cable or the like lines with high tensile strength. The control of the trough depth 40 at the vent 44 not only controls the cross-sectional area of the vent 44, but also serves to vary the deployable volume of the trough 36 and the exhaust angle 67a of the sail 28 along a medial axis 67b extending substantially perpendicular the inner edge 42 of the sail 28 with reference to the rig plane 34.

The guide vane assembly 20 further comprises a plurality of stiffeners 69 formed with the sail 28 for shaping the trough 40. Each of the plurality of stiffeners 69 is elongated and spatially inter-displaced along a medial segment 70 of the sail 28 from the outer portion 32 towards the inner portion 30 of the rig structure 26 with each of the plurality of stiffeners 69 being substantially perpendicular the pair of booms. Each of the plurality of stiffeners 69 are shaped and formed to be resiliently biased to accommodate and impart flexure to the medial segment 70 of the sail 28.

Each of the first mast 60 and the second mast 62 comprises a pair of flanges 72 outwardly extending from the respective one of the first mast 60 and the second mast 62 over a portion of the sail 28 oblique the rig plane 34. The pair of flanges 72 at each of the first mast 60 and the second mast 62 is to reduce escape of fluid from the trough 36 therebetowards.

The first boom 50 and the second boom 52 are rotatably coupled with the post 48 to enable varying of vane angle 74 of the rig plane 34 with reference to the turbine 22 about a first axis 76 defined adjacent the inner portion 30 of the rig structure 26. Specifically, the vane angle 74 is referenced from the tangent of a reference circle circumscribing the periphery of the turbine 22. The rig structure 26 comprises an actuator, for example a linear motor and a rotary motor, and a coupling assembly for communicating displacement to the first boom 50 and the second boom 52 about the first axis 76. The coupling assembly is at least one of a pulley assembly, a translational linkage and a plurality of gears interposing the actuator and the first boom 50 and the second boom 52.

The guide vane assembly 20 further comprises a rotary guide whereon the post 48 is coupled. The rotary guide is for pivotably guiding and positioning the rig structure 26 about a second axis. In one embodiment, the rotary guide comprises a circular actuator for displacement of the rig structure 26 along the rotary guide about the second axis.

The guide vane assembly 20 is for implementation with a guide vane structure 100 comprising a support structure 102 and a plurality of the guide vane assembly 20 as aforedescribed. The support structure 102 defines a cylindrical hollow 104 with a structure axis 106 extending along the longitude thereof. The cylindrical hollow 104 is for receiving the turbine 22 with the plurality of rotor blades 24 therewithin. The axis of rotation of the plurality of rotor blades 24 substantially coincides with the structure axis 106. The plurality of the guide vane assembly 20 is coupled to and along an outer portion 108 of the support structure 102 and spatially distributed about the structure axis 106.

The support structure 102 comprises an upper annular structure 108, a lower annular structure 110 and a plurality of pillars 112 extending between and inter-coupling the upper annular structure 108 and the lower annular structure 110. In some implementations, the support structure 102 sit on a circular guide rail to enable rotational displacement of the support structure 102 about the structure axis 106.

Based on quantity of the guide vane assembly 20 used and wind direction, displacement of the support structure 102 about the structure axis 106 allows for minor adjustments to be made on best presenting the sail 28 to the wind and to avoid flow dead zones.

In one embodiment, the turbine 22 is formed integral with the support structure 102. The turbine 22 comprises a cylindrically-shaped cage 114 for supporting the plurality of rotor blades 24. The cage 114 is adapted to enable each of the plurality of rotor blades 24 to rotate about its length and for controlling orientation of each of the rotor blades 24. The cage 114 is movably coupled to the support structure 102, functioning as a carousel with the support structure 102. Movable coupling can be achieved through a variety of coupling apparatus including a friction plate which interposes the cage 114 and the support structure 102. The friction plate comprises an annular protrusion which is disposed between each of an array of wheel pairs coupled to the cage 114. Each wheel pair rides on inner and outer faces of the annular protrusion of the friction plate to isolate rotation of the cage 114, and consequently travel of the plurality of rotor blades 24, to a specific path about the structure axis 106 and to reduce wobble in the displacement travel of the cage 114. Each of the wheels of the array of wheel pairs can be formed from a polymeric material and has either a solid core or an air-filled core. The cage 114 is coupled via universal joint to a generator for converting motion communicated from the turbine 22 into energy, for example electrical energy.

An array of six to eight of the guide vane assemblies 20 may be employed in the guide vane structure 100 in one embodiment and is arranged, for example, at equal angular spacing about the structure axis 106 with the first axis 76 substantially parallel the structure axis for functioning as outer guide vanes (OGVs) to the turbine 22. Based on the direction of the incoming wind, each array of guide vane assemblies 20 may serve to guide and shape air received at the windward side of the turbine for exhausting to the plurality of rotor blades 24 for driving the turbine 22.

Each of the plurality of rotor blades 24 is rotatable about its longitudinal axis for presenting the best blade orientation to the air exhausted from the windward projecting guide vane assembly. On the leeward side of the turbine 22, the leeward projecting guide vane assembly 20 functions to guide the air exiting the turbine 22 away therefrom to reduce impinging turbulence on the rotor blades 24.

In an exemplary configuration utilizing six of the guide vane assemblies 20, the guide vane assemblies outwardly extends from the support structure 102 at the 12 o'clock, 2 o'clock, 4 o'clock, 6 o'clock, 8 o'clock and 10 o'clock clock angular reference points on support structure 102 centering at the structure axis 106. With wind traveling in the direction of the turbine in the 9 o'clock to the 3 o'clock direction, wind will impinge the sail 28 of the guide vane assembly 20 at the 12 o'clock, 6 o'clock, 8 o'clock and 10 o'clock positions. In the use of a typical outer guide vane with a planar surface, the wind is likely to take the path of least resistance when impinging on the surface of the outer guide vane and be also dispersed away from the intended direction of flow towards the rotor blades 24. However in the case where the guide vane assembly 20 is utilized, wind is collected and concentrated in and along the trough 36 being redirected during exhaust from the vent 44 towards the leading edges of the rotor blades 24 proximal the respective guide vane assembly 20 at a particular instance.

The trough 36 also enables the build-up of air pressure therewithin to increase the mass flow rate of the air being exhausted from the vent 44. Further assistance is provided by the pair of flanges 72 at each of the first mast 60 and the second mast 62 to reduce spillover of air from the upper edge 56 and the lower edge 58 of the sail 28 which in turn mitigates pressure loss from the trough 36. Each of the rotor blades 24 is shaped to have a low pressure surface and a high pressure surface extending from the leading edge to the trailing edge thereof along its chord.

When wind, or fluid, is directed at leading edge of the rotor blades 24 towards the trailing edge thereof, a low pressure zone is created along the low pressure surface which provides lift to the rotor blade 24.

Hence, an increase in the mass flow rate of air directed at the respective rotor blades 24 by the guide vane assemblies at the 12 o'clock, 6 o'clock, 8 o'clock and 10 o'clock positions will generate lift at the respective rotor blades 24 which will in turn rotate the turbine 22. Even at the 12 o'clock and 6 o'clock positions, the guide vane assemblies 20 positioned thereat is able to redirect wind impinging the sail 28 perpendicular the rig plane 34 towards the turbine 22 and the leading edge of proximal rotor blades 24. This increases the number of rotor blades 24 that can benefit from wind, or air, exhausted from the guide vane assemblies 20.

The trough depth 40 of the trough 36 at the vent 44 is controllable to vary the outflow area at the vent 44. If the outflow area is too small for the inflow of air into the trough 36, the pressure build-up will restrict and hinder the outflow from the vent 44. However, if the trough depth 40 of the trough 36 at the vent 44 is too deep, the inner edge 42 of the sail 28 may collide with the rotor blades 24 displaced adjacent thereto. A further consideration is the exhaust angle 66a of the sail 28 at the region of the vent which has to be configured with the vane angle 74 of the rig plane 34 with reference to the turbine 22 and orientation of the rotor blades 24 to prevent stalling and to obtain the best possible lift coefficient. Further, adjustments to the vane angle 74 of each of the guide vane assembly 20 are to reduce overlap between adjacent guide vane assemblies 20 in the direction of the wind.

The turbine 22 further comprises inner guide vanes 120 for concentrically interposing the rotor blades 44 between the guide vane assemblies 20 and the inner guide vanes 120. As the wind travels across the respective rotor blades 44 from the guide vane assemblies 20 at the 12 o'clock, 6 o'clock, 8 o'clock and 10 o'clock positions, the wind is guided into a central space by a first portion of the inner guide vanes 120 before flowing across a second portion of the inner guide vanes 120 to be directed towards the rotor blades 44 between the 2 o'clock and 4 o'clock positions. The leading edges of the rotor blades between the 2 o'clock and 4 o'clock positions are presented to the inner guide vanes 120 to harvest remaining wind energy therefrom before the wind exits towards the guide vane assemblies 20 at the 2 o'clock and 4 o'clock positions.

The trough depth 40 of the trough 36 at the vent 44 of each guide vane assembly 20 at the 2 o'clock and 4 o'clock positions is substantially reduced to reduce drag as the wind approaches the sail 28 thereof from the inner portion 30 towards the outer portion 32 of the rig structure 26 thereof. The vane angle 74 of the rig plane 34 of each guide vane assembly 20 at the 2 o'clock and 4 o'clock positions may be further optimized to guide flow of wind exiting the rotor blades 44 to reduce turbulence or eddy swirls thereat which may introduce drag to the rotor blades 44.

Aspects of particular embodiments of the present disclosure address at least one aspect, problem, limitation, and/or disadvantage associated with existing guide vanes. While features, aspects, and/or advantages associated with certain embodiments have been described in the disclosure, other embodiments may also exhibit such features, aspects, and/or advantages, and not all embodiments need necessarily exhibit such features, aspects, and/or advantages to fall within the scope of the disclosure. It will be appreciated by a person of ordinary skill in the art that several of the above-disclosed structures, components, or alternatives thereof, can be desirably combined into alternative structures, components, and/or applications. In addition, various modifications, alterations, and/or improvements may be made to various embodiments that are disclosed by a person of ordinary skill in the art within the scope of the present disclosure, which is limited only by the following claims.

The invention claimed is:

1. A guide vane assembly comprising:
   a rig structure configurable with a turbine and having an inner portion and an outer portion forming extremities thereof, the rig structure defining a rig plane with the inner portion being positioned nearer to the turbine than the outer portion;
   a sail coupled to the rig structure and shaped as a trough for a flow of impinging fluid, the trough having a depth defined from the rig plane, the sail extending from the outer portion towards the inner portion of the rig structure to terminate at an inner edge whereat a vent is defined, the fluid impinging on the sail being concentrated at the trough and redirected towards the turbine from the vent; and
   an actuator assembly coupled to the rig structure and whereto a portion of the sail at the vent is anchored, the actuator assembly being operable for positioning the inner edge of the sail one of towards or away from the rig plane for varying the depth of the trough at the vent.

2. The guide vane assembly as in claim 1, wherein the sail is formed from a flexible material for enabling displacement of the trough across the rig plane by the impinging fluid.

3. The guide vane assembly as in claim 1, wherein the depth of the trough increases as the sail extends from the outer portion towards the inner portion of the rig structure.

4. The guide vane assembly as in claim 1, wherein the actuator assembly comprises a winch and a control line whereto the inner edge of the sail is coupled, the winch for one of taking or releasing slack in the control line to thereby displace the inner edge of the sail one of towards or away from the rig plane.

5. The guide vane assembly as in claim 1, wherein the rig structure comprises:
   a post configured at the inner portion of the rig structure; and
   a pair of booms extending from the post.

6. The guide vane assembly as in claim 5, further comprising a plurality of stiffeners formed with the sail for shaping the trough.

7. The guide vane assembly as in claim 6, wherein each of the plurality of stiffeners is elongated and spatially inter-displaced along a medial segment of the sail from the outer portion towards the inner portion of the rig structure with each of the plurality of stiffeners being substantially perpendicular the pair of booms.

8. The guide vane assembly as in claim 5, wherein each of the pair of booms has a mast coupled thereto, the sail being slidably coupled to the mast of each of the pair of boom for being slidably displaceable for collapsing towards the inner portion of the rig structure.

9. The guide vane assembly as in claim 8, wherein each mast comprises a pair of flanges extending therefrom oblique to the rig plan to reduce an escape of fluid from the trough theretowards.

10. The guide vane assembly as in claim 5, wherein each of the pair of booms and the post is a truss structures.

11. The guide vane assembly as in claim 5, wherein the pair of booms are rotatably coupled with the post to enable varying of an angle of the rig plane with the turbine about a first axis defined adjacent the inner portion of the rig structure.

12. The guide vane assembly as in claim 5, wherein the rig structure comprises a boom actuator and at least one of a pulley, a translational linkage or a plurality of gears interposing the boom actuator and the pair of booms for communicating displacement thereto about the first axis.

13. The guide vane assembly as claim 5 further comprising a rotary guide whereon the post is coupled, the rotary guide for pivoting the rig structure about a second axis.

14. The guide vane assembly as in claim 13, wherein the rotary guide comprises a circular actuator for displacement of the rig structure along the rotary guide about the second axis.

15. A guide vane structure comprising:
   a support structure defining a cylindrical hollow with a structure axis extending along a longitude thereof, the cylindrical hollow for receiving a turbine comprising a plurality of rotor blades therewithin, an axis of rotation of the plurality of rotor blades substantially coinciding with the structure axis;
   a plurality of guide vane assemblies coupled to and along an outer portion of the support structure and spatially distributed about the structure axis, each of the plurality of guide vanes comprising:

a rig structure having an inner portion and an outer portion forming extremities thereof, the rig structure defining a rig plane with the inner portion being positioned nearer to the turbine than the outer portion, a sail coupled to the rig structure and shaped as a trough for a flow of impinging fluid, the trough having a depth defined from the rig plane, the sail extending from the outer portion towards the inner portion of the rig structure to terminate at an inner edge whereat a vent is defined, the fluid impinging on the sail being concentrated at the trough and redirected towards the turbine from the vent, and an actuator assembly coupled to the rig structure and whereto a portion of the sail at the vent is anchored, the actuator assembly being operable for positioning the inner edge of the sail one of towards or away from the rig plane for varying the depth of the trough at the vent.

16. The guide vane structure as in claim 15, wherein the turbine is formed integral with the support structure.

17. The guide vane structure as in claim 15, wherein the support structure comprises:
an upper annular structure;
a lower annular structure; and
a plurality of pillars extending between and inter-coupling the upper annular structure and the lower annular structure.

18. The guide vane structure as in claim 17, wherein at least one of the upper annular structure, the lower annular structure or the plurality of pillars is formed from truss structures.

19. The guide vane structure as in claim 15, further comprising:
a guide rail whereon the support structure sits for enabling rotational displacement of the support structure about the structure axis.

20. The guide vane structure as in claim 15, further comprising a friction plate inter-coupling the support structure and a cage, the cage for supporting the plurality of rotor blades for rotational displacement about the structure axis in the turbine.

21. The guide vane structure as in claim 20, wherein, the friction plate comprises an annular protrusion which is disposed between each of an array of wheel pairs coupled to the cage, each of the wheel pairs for riding on inner and outer faces of the annular protrusion of the friction plate to isolate rotation of the cage and travel of the plurality of rotor blades to a specific path about the structure axis and to reduce wobble in the displacement travel of the cage.

* * * * *